(12) United States Patent
Miyanaga et al.

(10) Patent No.: US 6,922,453 B2
(45) Date of Patent: Jul. 26, 2005

(54) DIVERSITY RECEIVER

(75) Inventors: Kenji Miyanaga, Neyagawa (JP);
Hidetoshi Yamasaki, Amagasaki (JP);
Yoshio Urabe, Shijonawate (JP);
Hitoshi Takai, Toyono-gun (JP);
Kenichi Mori, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 629 days.

(21) Appl. No.: 10/140,889

(22) Filed: May 9, 2002

(65) Prior Publication Data

US 2002/0168039 A1 Nov. 14, 2002

(30) Foreign Application Priority Data

May 11, 2001 (JP) ........................................ 2001-141209

(51) Int. Cl.[7] ................................................. H04B 7/10
(52) U.S. Cl. ......................... 375/347; 375/267; 455/134
(58) Field of Search ................................ 375/267, 347; 455/135, 137, 303, 134, 296

(56) References Cited

U.S. PATENT DOCUMENTS

| 5,455,844 A | * 10/1995 | Ishikawa et al. ............. 375/232 |
| 6,181,749 B1 | 1/2001 | Urabe et al. |
| 6,512,738 B1 | * 1/2003 | Namekata et al. ............ 370/210 |

FOREIGN PATENT DOCUMENTS

| EP | 0 620 657 | 10/1994 |
| EP | 0 913 958 | 5/1999 |
| JP | 2000-4192 | 1/2000 |

* cited by examiner

Primary Examiner—Temesghen Ghebretinsae
(74) Attorney, Agent, or Firm—Wenderoth, Lind & Ponack, L.L.P.

(57) ABSTRACT

A diversity receiver carries out error detection, error correction, and data detection on each detected data string 21. An output switching unit 17 outputs a decoded data string 24 of a branch selected by a branch selector 16. The branch selector 16 selects a branch of highest priority in priority information 29 from branches of which a data detection signal 25 indicates that the data is valid and of which the number of error symbols 22 coincides with a minimum value. In the priority information 29, higher priority is assigned to a branch that includes an antenna of which the coverage is closer to that of an antenna included in a branch selected at the immediately-previous time. Thus, selected from the plurality of branches having the minimum number of error symbols 22 is the one that includes the antenna of which the coverage is closest to the coverage of the antenna included in the branch selected at the immediately-previous time. Therefore, it is possible to suppress the occurrence of misselection of a poor-quality branch, and improve a reception characteristic.

10 Claims, 10 Drawing Sheets

FIG. 3A

| PREVIOUSLY-SELECTED BRANCH | SELECTABLE BRANCHES (IN ORDER OF PRIORITY) |
|---|---|
| X1 | X1 X2 X4 X3 X7 ••• |
| ⋮ | ⋮ |
| Xi | Xi Xj Xk Xm Xn ••• |
| ⋮ | ⋮ |
| Xt | Xt Xs Xr Xv Xu ••• |

FIG. 3B

| PREVIOUSLY-SELECTED BRANCH | PRIORITY OF BRANCHES | | | | |
| --- | --- | --- | --- | --- | --- |
| | $X1$ | ••• | $Xi$ | •• | $Xt$ |
| X1 | Y11 | | Y1i | | Y1t |
| ⋮ | | | ⋮ | | |
| Xi | Yi1 | ••• | Yii | •• | Yit |
| ⋮ | | | ⋮ | | |
| Xt | Yt1 | | Yti | | Ytt |

DIVERSITY RECEIVER

BACKGROUND OF THE INVENTION

1. Field of the Invention

The present invention relates to receivers for use in a mobile communications system and, more specifically, to a diversity receiver for reducing transmission errors by selecting one of a plurality of branches.

2. Description of the Background Art

In diversity reception, generally known is a scheme of selecting a branch that is the highest in received power from a plurality of branches. In mobile communications, however, an error may occur even on a signal outputted by the branch that is high in received power, due to radio interferences, multipath, or other factors. Therefore, it is impossible to correctly select a high-quality branch only based on the received power. An example scheme for solving this problem is disclosed in Japanese Patent Laid-Open Publication No. 2000-4192, which corresponds to U.S. Pat. No. 6,181,749, describing a diversity receiver for selecting a high-quality branch with high accuracy even with less-redundant error correcting/detecting code having a short length.

FIG. 11 is a block diagram showing the construction of a conventional diversity receiver disclosed in the above gazette. This diversity receiver includes antennas $10a$ to $10z$, detectors $11a$ to $11z$, error detectors/correctors $51a$ to $51z$, a data detector 15, a data comparator 52, and a data selector 53. The antennas $10a$ to $10z$ receive, independently for each other, radio waves emitted from a transmitter, and output modulated signals $20a$ to $20z$, respectively.

The signal 20 is modulated with data illustrated in FIG. 2. The data is composed of a unique word (UW) 71 and j blocks $72a$ to $72j$. The unique word 71 is provided at the head of a string of data for enabling detection of the head of the following valid data. Each of the blocks $72a$ to $72j$ is data of n bits coded with error correcting code. The error correcting code used for coding the block 72 is binary BCH (Bose-Chaudhuri-Hocquenghem) code. The BCH code has codewords composed of information data of k bits and check bits of 2 m bits and is capable of 2-bit error correction.

The detectors $11a$ to $11z$ and the error detectors/correctors $51a$ to $51z$ are provided correspondingly to the antennas $10a$ to $10z$. The antennas $10a$ to $10z$, the detectors $11a$ to $11z$, and the error detectors/correctors $51a$ to $51z$ construct branches for processing the modulated signals $20a$ to $20z$, respectively.

The modulated signals $20a$ to $20z$ are subjected to the same processing on the respective branches. The detectors $11a$ to $11z$ detect the modulated signals $20a$ to $20z$, and output detected data strings $21a$ to $21z$, respectively. The error detectors/correctors $51a$ to $51z$ carry out error detection and error correction on the detected data strings $21a$ to $21z$, respectively. As stated above, the detected data strings $21a$ to $21z$ has been coded with BCH code capable of 2-bit error correction. Therefore, the error detectors/correctors $51a$ to $51z$ output any one of no error, one-bit error, two-bit error, or three-bit or more error, respectively, as the numbers of error symbols $22a$ to $22z$ included in the detected data strings $21a$ to $21z$. Also, the error detectors/correctors $51a$ to $51z$ detect error locations $23a$ to $23z$ indicating locations of the error bits in the detected data strings $21a$ to $21z$, and output decoded data strings $24a$ to $24z$ after correction, respectively.

When two-bit or less error occurs in the detected data string 21, the error detector/corrector 51 outputs the decoded data string 24 with its error properly corrected. In some cases, however, three-bit or more error and two-bit or less error are not distinguishable by using 2-bit error correcting BCH code. As a result, when three-bit or more error occurs in the detected data string 21, the error detector/corrector 51 may output the decoded data string 24 with its errors improperly corrected. Such improper data correction is hereinafter referred to as miscorrection.

The data detector 15 checks whether the detected data strings $21a$ to $21z$ include the unique word 71, and outputs detection signals $25a$ to $25z$ respectively indicating the check results. The data comparator 52 compares the decoded data strings $24a$ to $24z$ with each other, and outputs decision signals $62a$ to $62z$ respectively indicating whether the error locations $23a$ to $23z$ are correct. For example, the data comparator 52 compares data located at the error location $23a$ in the decoded data string $24a$ with data located at the same location in another decoded data string and, based on the comparison result, outputs the decision signal $62a$. The data selector 53 selects one of the decoded data strings $24a$ to $24z$ for each block 72. This selection is based on the detection signals $25a$ to $25z$ outputted from the data detector 15, the numbers of error symbols $22a$ to $22z$ detected in the error detectors/correctors $51a$ to $51z$, and the decision signals $62a$ to $62z$ outputted from the data comparator 52. The data selector 53 then outputs the selected decoded data string as an output data string 63.

As such, the conventional diversity receiver compares the decoded data strings $24a$ to $24z$ with each other, and based on the comparison results, selects one of these decoded data strings $24a$ to $24z$ for output. Therefore, if each branches are similar in quality and miscorrection is caused by relatively less bit error, misselection of a branch low in quality can be prevented. Therefore, according to the conventional diversity receiver, error detection can be accurately carried out even with less-redundant code having a short length, thereby enabling a high-quality branch to be selected.

However, the above conventional diversity receiver has the following drawbacks. For example, consider a case where the branches greatly differ in quality from each other: some are of good quality and some are of extremely poor quality. In this case, even though a poor-quality branch has numerous error bits, the branch may be determined as having less error bits due to miscorrection. Consequently, the data comparator has to compare a decoded data string properly corrected in a good-quality branch with a decoded data string improperly corrected in a poor-quality branch, thereby making the decision signal less reliable. Moreover, the data selector selects a branch based on such a less-reliable decision signal, and therefore the selected branch may be of extremely poor quality. Such improper branch selection is hereinafter referred to as misselection.

In the conventional diversity receiver, if the number of error symbols in a modulated signal is within a range that can be corrected with error correcting code, a decoded data string is ensured of being correct, and therefore misselection does not occur. In contrast, if the number of error symbols exceeds the range, error correction may cause miscorrection and, consequently, may also cause misselection, thereby greatly degrading the reception characteristic of the diversity receiver.

In the conventional diversity receiver, the probability that misselection can occur is calculated as follows. Misselection can occur when the number of error symbols calculated for a poor-quality branch is equal to or smaller than that calculated for a good-quality branch. Hereinafter, assume that there are two branches, the branch A of good quality and the branch B of poor quality; and a bit error rate (BER) of the branch A is $P_e$ ($P_e \ll 1$) and a BER of the branch B is 0.5. That is, the BER of the branch A is sufficiently smaller than 1, and the decoded data string outputted from the branch B has 0s and is appearing at random. Also assume that (63, 51) BCH code capable of 2-bit error correction is used as error correcting code.

In the branch A, a probability $P_a(k)$ of occurrence of k-bit error in one block is given by the following equation.

$$P_a(k) = {}_{63}C_k \times P_e^k \times (1-P_e)^{63-k}$$

$$(k=0, 1, \ldots, 63)$$

Next, in the branch B, a probability $P_b(k)$ of occurrence of k-bit error in one block is given as follows. Here, the number of possible bit strings of 63 bits is $2^{63}$. Of these bit strings, the number of possible bit strings determined as having no error is $2^{51}$, the number of possible bit strings determined as having one-bit error is ${}_{63}C_1 \times 2^{51}$, and the number of possible bit strings determined as having two-bit error is ${}_{63}C_2 \times 2^{51}$. Therefore, the probability $P_b(k)$ is given by the following equation.

$$P_b(k) = {}_{63}C_k \times 2^{51}/2^{63} = {}_{63}C_k/2^{12}$$

$$(k=0, 1, 2)$$

Assuming that the probability of occurrence of two or more bit error in the branch A is sufficiently low and negligible, misselection may occur in the following three cases: 1) both of the branch A and the branch B are determined as no error; 2) both of the branch A and the branch B are determined as one error bit; and 3) the branch A is determined as one-bit error, and the branch B is determined as no error. In these three cases, the probabilities of occurrence of misselection are hereinafter denoted as $P_{00}$, $P_{11}$, and $P_{10}$, respectively. Since $63P_e \ll 1$ holds, the probabilities $P_{00}$, $P_{11}$, and $P_{10}$ are given by the following equations.

$$P_{00} = P_a(0) \times P_b(0) \approx 2.4 \times 10^{-4}$$

$$P_{11} = P_a(1) \times P_b(1) \approx 0.97 \times P_e$$

$$P_{10} = P_a(1) \times P_b(0) \approx 0.015 \times P_e$$

Therefore, if $P_e = 10^{-8}$, for example, a probability Q that misselection can occur is given by the following equation.

$$Q = P_{00} + P_{11} + P_{10}$$
$$= 2.4 \times 10^{-4} + 9.7 \times 10^{-9} + 1.5 \times 10^{-10}$$
$$\approx 2.4 \times 10^{-4}$$

As can be seen from the above, the probability Q mainly depends on the probability $P_{00}$ that both of the branches A and B are determined no error. Here, assume that a probability of actual occurrence of misselection is ½, and a bit error rate when misselection occurs is 0.5. Therefore, an average bit error rate R is given as the following equation.

$$R = 2.4 \times 10^{-4} \times 0.5 \times 0.5 = 6 \times 10^{-5}$$

On the other hand, a bit error rate when misselection does not occur is $10^{-8}$. Therefore, the average bit error rate becomes greatly degraded due to misselection.

One scheme for suppressing the occurrence of misselection is suppressing the occurrence of miscorrection by increasing redundancy in or a code length of error correcting code. However, increasing redundancy in error correcting code reduces transmission efficiency. Also, increasing the code length of the error correcting code increases delay time in processing. Therefore, the processing cannot follow temporal changes in a propagation channel due to fading.

SUMMARY OF THE INVENTION

Therefore, an object of the present invention is to provide a diversity receiver that can improve a good reception characteristic by suppressing the occurrence of misselection without increasing redundancy in or a code length of error correcting code.

The present invention has the following features to attain the object mentioned above.

A first aspect of the present invention is directed to a diversity receiver for receiving modulated signals each modulated with a data string coded for error correction. The diversity receiver includes: a plurality of antennas for receiving, independently of each other, the modulated signals; a detector for detecting the modulated signals received by the antennas, and obtaining a plurality of detected data strings: an error detector for detecting the numbers of error symbols and error locations in the respective detected data strings; a branch selector for selecting one of branches composed of the antennas, the detector, and the error detector; an output generator for outputting a result obtained by carrying out, with reference to the error locations detected by the error detector, error correction on one of the detected data strings that corresponds to a selection result indicating the branch selected by the branch selector; a selection result storage unit for storing the selection result of the branch selector; and a priority information generator for generating priority information indicating priority in branch selection based on the selection result stored in the selection result storage unit, wherein the branch selector selects the branch based on the numbers of error symbols detected by the error detector and the priority information generated by the priority information generator.

In the above first aspect, the branch selector selects a branch based on the number of error symbols and the priority information generated based on a previous selection result. Thus, by expediently generating the priority information based on the previous selection result, it is possible to suppress the occurrence of misselection of a poor-quality branch, and improve the reception characteristic.

In this case, the branch selector may select the branch of highest priority in the priority information from the branches of which the number of error symbols is minimum. More preferably, the selection result storage unit may store an immediately-previous selection result indicating the branch selected at the immediately-previous time by the branch selector, and the priority information generator may generate the priority information based on the immediately-previous selection result stored in the selection result storage unit. Still more preferably, the priority information may indicate that the branch is assigned higher priority as a coverage of the antenna included in the branch is closer to a coverage of the antenna included in the branch selected at the immediately-previous time.

Thus, if the coverage of the antenna included in the branch is close to the coverage of the antenna included in the previously-selected branch, the former branch is assigned higher priority. A transmitter is presumably located in the vicinity of the coverage of the previously-selected branch. Therefore, the branch of which the coverage is closer to that of the previously-selected branch is assigned higher priority for branch selection. Thus, it is possible to suppress the occurrence of misselection of a poor-quality branch, and improve the reception characteristic.

Furthermore, the priority information may indicate a branch to be excluded for branch selection, and the branch selector may select one of the branches other than the branch indicated to be excluded by the priority information. More preferably, the priority information may indicate that the branch to be excluded includes the antenna of which the coverage is a predetermined distance away from the coverage of the antenna included in the branch selected at the immediately-previous time.

Thus, if the coverage of the antenna included in the branch is a predetermined distance away from the coverage of the branch selected at the immediately-previous time, the former branch is excluded from selectable branches, and is never selected. Therefore, it is possible to suppress the occurrence of misselection of a poor-quality branch, and improve the reception characteristic.

According to a second aspect of the present invention, in the first aspect, the output generator includes: an error corrector for correcting the detected data strings with the error locations detected by the error detector and obtaining a plurality of decoded data strings; and an output switching unit for selecting and outputting one of the decoded data strings based on the selection result of the branch selector.

According to a third aspect of the present invention, in the first aspect, the output generator includes: a switching unit for selecting, based on the selection result of the branch selector, one of the detected data strings, and one of the error locations detected by the error detector; and an error corrector for correcting the detected data string selected by the switching unit with the error location selected by the switching unit, and outputting the corrected detected data string.

In the second or third aspect, data selection is carried out before or after error correction, thereby obtaining the error-corrected detected data string. Especially, according to the third aspect, the number of error correctors is small, thereby reducing the circuit size.

According to a fourth aspect, in the first aspect, the antennas are arranged at a same location and directed differently from each other.

In the above fourth aspect, the diversity receiver can be obtained by arranging the plurality of directional antennas at the same location.

According to a fifth aspect, in the first aspect, the antennas are arranged at different locations.

In the fifth aspect, the diversity receiver can be obtained by arranging the plurality of antennas at different locations.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are illustrations each showing an example of a priority table stored in a priority information generator of the diversity receiver according to the embodiments of the present invention;

DESCRIPTION OF THE PREFERRED EMBODIMENTS (First Embodiment)

Figure 1:
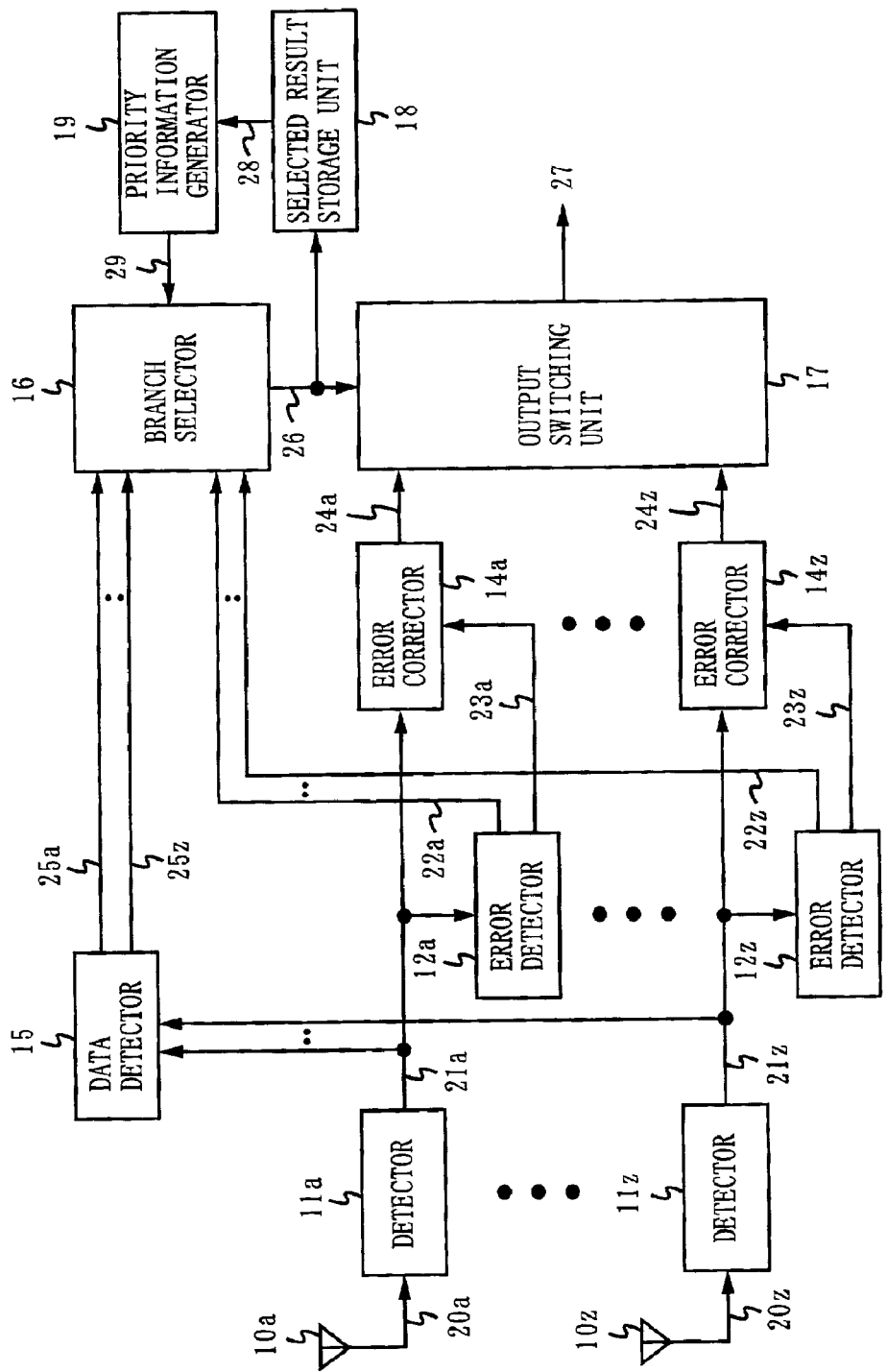
FIG. 1 is a block diagram showing the construction of a diversity receiver according to a first embodiment of the present invention.

FIG. 1 is a block diagram illustrating the construction of a diversity receiver according to a first embodiment of the present invention. The diversity receiver illustrated in FIG. 1 includes antennas $10a$ to $10z$, detectors $11a$ to $11z$, error detectors $12a$ to $12z$, error correctors $14a$ to $14z$, a data detector 15, a branch selector 16, an output switching unit 17, a selection result storage unit 18, and a priority information generator 19. This diversity receiver is characterized in that the number of error symbols and also priority information generated based on a previous branch selection result are used for branch selection.

Figure 11:
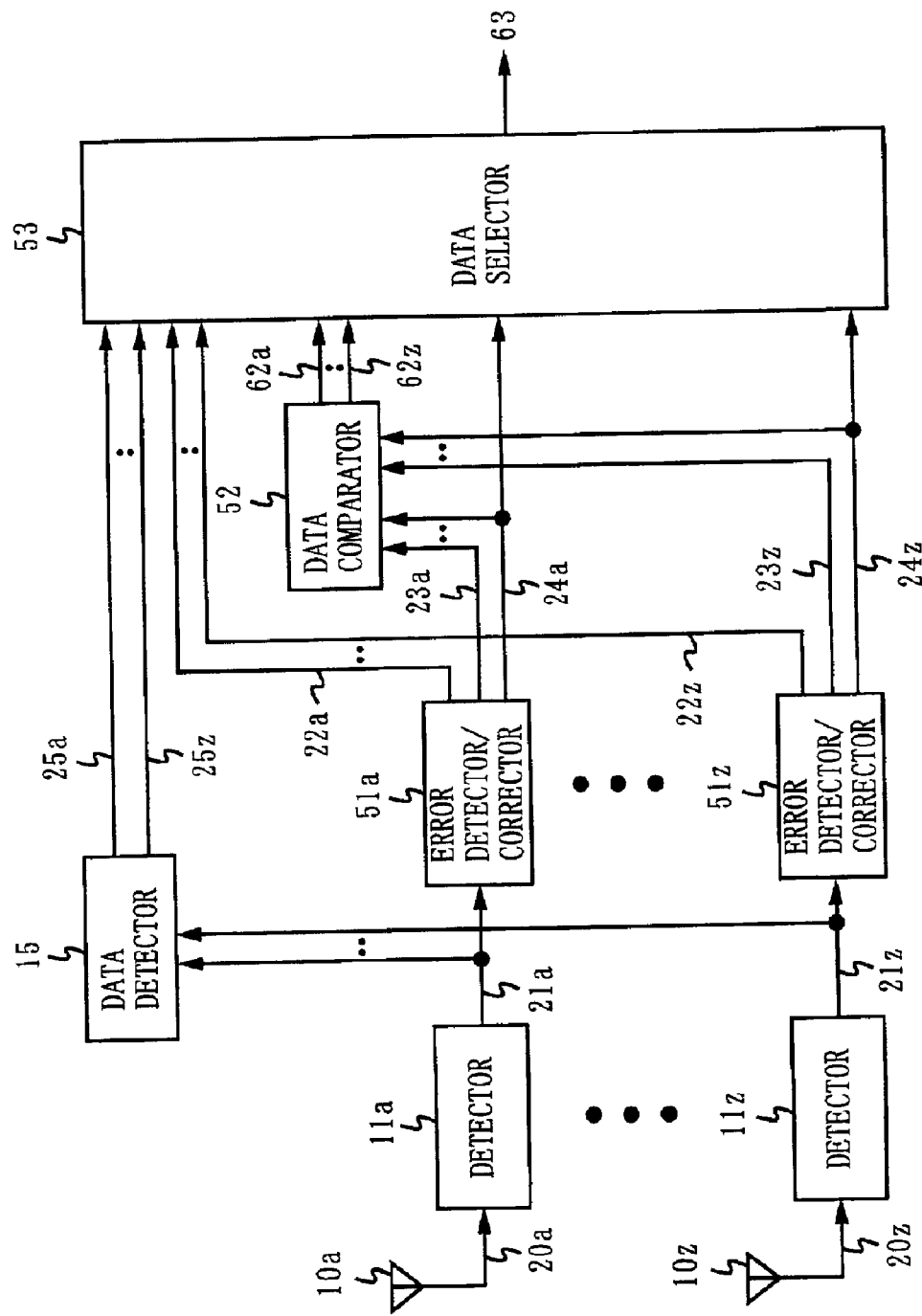
FIG. 11 is a block diagram showing the construction of a conventional diversity receiver.

Compared with FIG. 11, the error detectors $12a$ to $12z$ and the error correctors $14a$ to $14z$ illustrated in FIG. 1 collectively correspond to the error detectors/correctors $51a$ to $51z$ illustrated in FIG. 11. Also, the branch selector 16 and the output switching unit 17 illustrated in FIG. 1 collectively correspond to the data selector 53 illustrated in FIG. 11. The branch selector 16, the selection result storage unit 18, and the priority information generator 19 illustrated in FIG. 1 are components unique to the diversity receiver according to the present invention.

Figure 2:
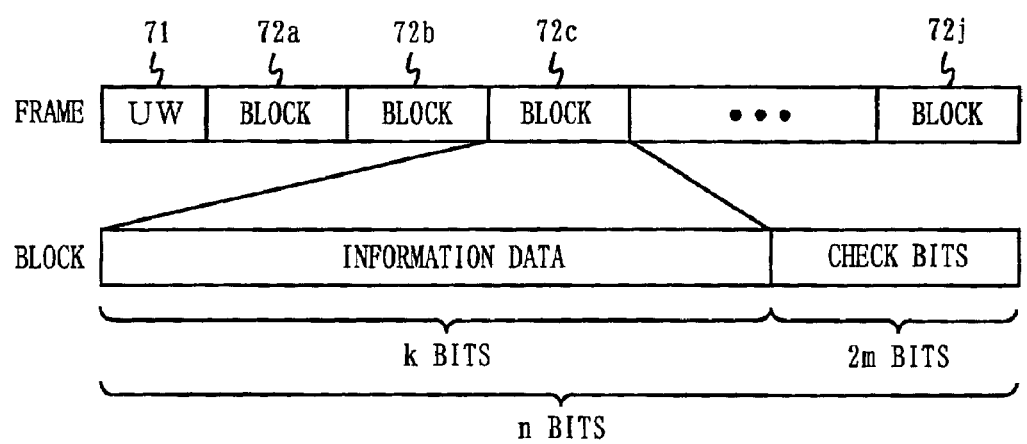
FIG. 2 is an illustration showing a format of data received by the diversity receiver according to embodiments of the present invention.

Described below is the operation of the diversity receiver illustrated in FIG. 1. The antennas $10a$ to $10z$ receive, independently of each other, radio waves emitted from a transmitter, and output modulated signals $20a$ to $20z$, respectively. The signal 20 has been modulated with data illustrated in FIG. 2. That is, the data used for modulation of the signal 20 has the structure of a plurality of frames each composed of the unique word 71 and j blocks $72a$ to $72j$. The unique word 71 is provided at the head for enabling detection of the head of the following valid data. The blocks $72a$ to $72j$ are data of n bits coded with error correcting code, and placed subsequently to the unique word 71. In the present embodiment, assume that the block 72 has been encoded with binary BCH code that has codewords composed of information data of k bits and check bits of 2 m bits and is capable of 2-bit error correction. Note that, in this case, a relation expressed by n=k+2 m holds. Alternatively, for example, the block 72 may have been coded with another error correcting code, such as BCH code capable of 3-bit or more error correction.

The detectors 11a to 11z, the error detectors 12a to 12z, and the error correctors 14a to 14z are provided correspondingly to the antennas 10a to 10z. The antennas 10a to 10z, the detectors 11a to 11z, the error detectors 12a to 12z, and the error correctors 14a to 14z construct branches for processing the modulated signals 20a to 20z, respectively.

The modulated signals 20a to 20z are subjected to the same processing on the respective branches. The detectors 11a to 11z detect the modulated signals 20a to 20z, and output the detected data strings 21a to 21z, respectively. The error detectors 12a to 12z calculate syndromes for decoding the BCH-coded detected data strings 21a to 21z, respectively, and carry out error detection on the detected data strings 21a to 21z with the syndromes. As mentioned above, the detected data strings 21a to 21z have been coded with BCH code capable of 2-bit error correction. Therefore, the error detectors 12a to 12z output, as the numbers of error symbols 22a to 22z included in the detected data strings 21a to 21z, any one of the following: no error, one-bit error, two-bit error, three-bit or more error. The error detectors 12a to 12z also detect error locations 23a to 23z each indicating the location of an error bit in the detected data strings 21a to 21z, and output the error locations 23a to 23z.

The error corrector 14a to 14z use the error locations 23a to 23z to correct the error in the detected data strings 21a to 21z, and output decoded data strings 24a to 24z after correction. Note that the error detectors 12a to 12z and the error correctors 14a to 14z are components that can be obtained by dividing the functions of the error detectors/ correctors 51a to 51z illustrated in FIG. 11 into error detectors and error correctors, for convenience in description.

The data detector 15 checks whether the unique word 71 is included in the detected data strings 21a to 21z, respectively, and output the detection signals 25a to 25z indicating the detection results. The branch selector 16 is supplied with the detection signals 25a to 25z, the numbers of error symbols 22a to 22z, and priority information 29 outputted from the priority information generator 19. The branch selector 16 selects, for each block 72, a branch from the plurality of branches, according to the procedure described later (FIG. 5), and outputs a selection result 26 indicating the selected branch. The selection result 26 is supplied to the output switching unit 17 and the selection result storage unit 18.

The output switching unit 17 selects one decoded data string from the decoded data strings 24a to 24z based on the selection result 26, and outputs the selected decoded data string as an output data string 27. The diversity receiver illustrated in FIG. 1 outputs the output data string 27 as data having the best characteristic of all received through the plurality of antennas 10a to 10z.

The selection result storage unit 18 stores a predetermined number of selection results 26. In the present embodiment, the selection result storage unit 18 stores only one selection result 26, and outputs the stored selection result 26 as a previous selection result 28. The priority information generator 19 stores a priority table indicating, for each branch selected at the immediately-previous time, the order of priority of branches selectable this time. The priority information generator 19 retrieves data corresponding to the previous selection result 28 from the priority table, and outputs the retrieved data as priority information 29. The priority information 29 is supplied to the branch selector 16, and is referred to for branch selection by the branch selector 16.

Figure 4:
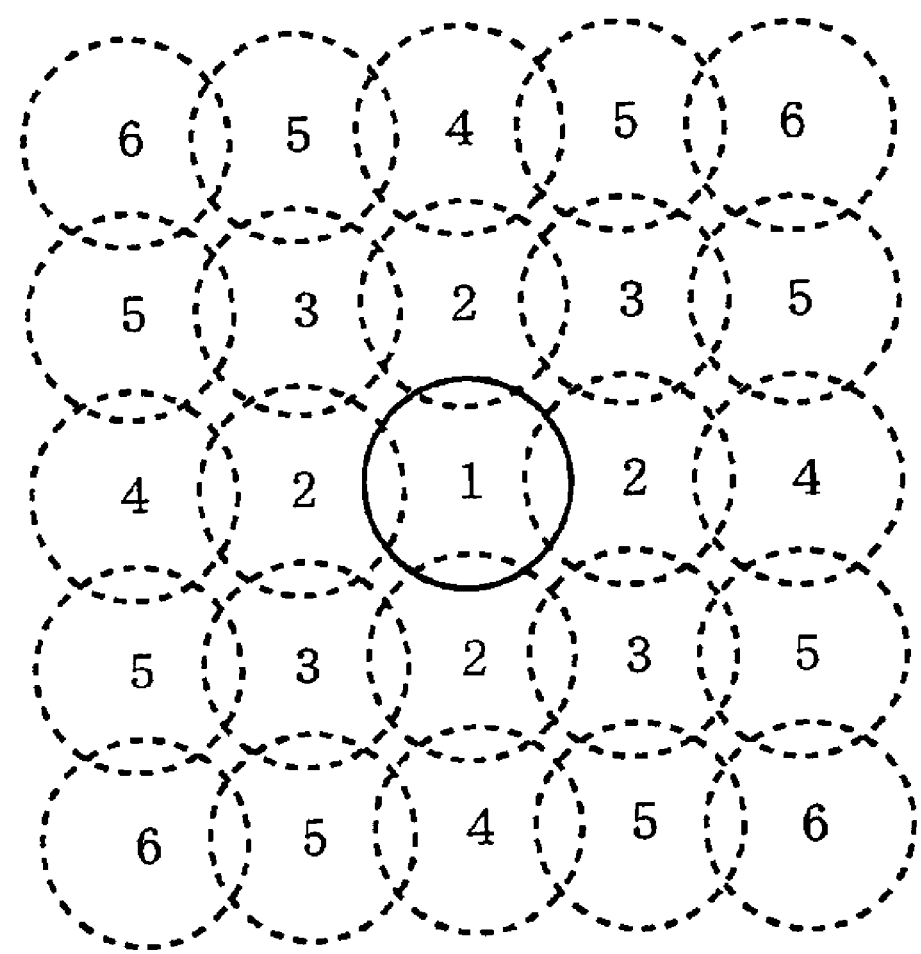
FIG. 4 is an illustration as to the diversity receiver according to the first embodiment, showing a state where each branch is assigned priority correspondingly to a coverage of each antenna.

With reference to FIGS. 3A, 3B and 4, the priority information 29 is described. FIGS. 3A and 3B are illustrations each showing an example of the priority table stored in the priority information generator 19. The priority table contains data indicating, for each branch selected at the immediately-previous time (hereinafter referred to previously-selected branch), which branch has higher priority to be selected this time. The priority table may be as illustrated in FIG. 3A, where the branches are arranged in order of priority for each previously-selected branch, or may be as illustrated in FIG. 3B, where values indicating priority for the branches are arranged for each previously-selected branch.

Details of the priority table are determined based on a coverage of the antenna included in each branch. Specifically, as the coverage of the antenna included in a selectable branch is closer to that of the antenna included in the previously-selected branch, the selectable branch is assigned higher priority. Also, the previously-selected branch is always assigned the highest priority. Note that the coverage of the antenna is an area including locations from which the antenna can receive radio waves at received power enough for achieving required receive quality. The coverage of the antenna is defined mainly by a signal propagation distance and antenna's directivity.

FIG. 4 is an illustration showing the state where each branch is assigned priority correspondingly to the coverage of each antenna. In FIG. 4, dotted circles each indicate the coverage of the antenna included in each branch, and a circle at the center indicates the coverage of the antenna included in the previously-selected branch. A numerals written at the center of each circle indicates a degree of priority assigned to the branch corresponding to the coverage. Here, assume that a smaller numeral indicates higher priority. The branch corresponding to the coverage at the center (center coverage) is assigned the highest priority (priority 1). The coverages that are closest to the center coverage are those adjacent to the upper, lower, right, and left sides of the center coverage. Therefore, the branches corresponding those four coverages are assigned the second-highest priority (priority 2). The coverages that are second closest to the center coverage are those diagonally adjacent thereto. Therefore, the branches corresponding those four coverages are assigned the third-highest priority (priority 3). Similarly, as the coverage is closer to the center coverage, the branch corresponding thereto is assigned higher priority.

Figure 5:
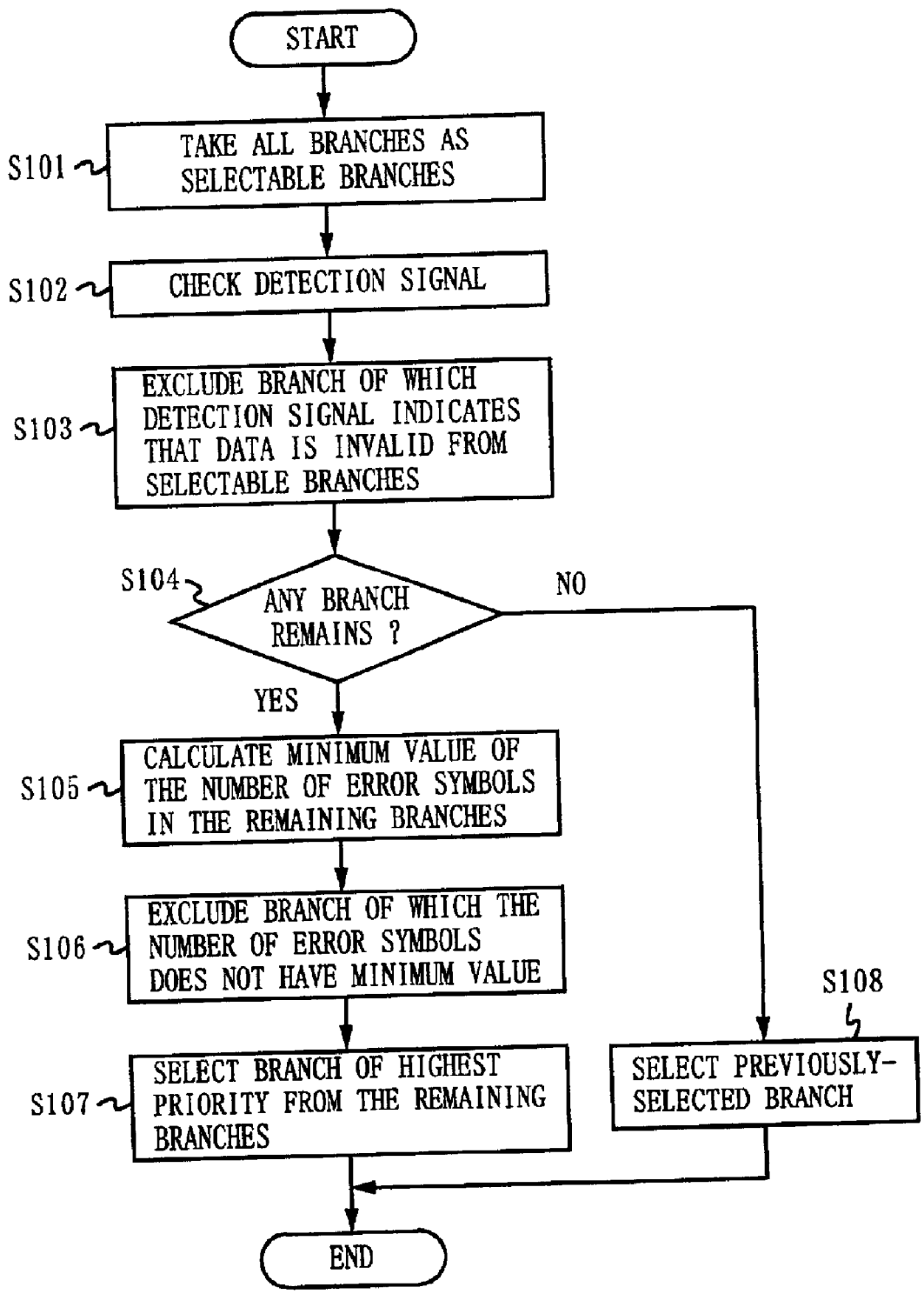
FIG. 5 is a flowchart showing the procedure of branch selection carried out by a branch selector of the diversity receiver according to the first embodiment of the present invention.

FIG. 5 is a flowchart showing the procedure of branch selection carried out by the branch selector 16 of the diversity receiver according to the present embodiment. The branch selector 16 takes all branches included in the diversity receiver as selectable branches (step S101). The branch selector 16 then checks the detection signals 25a to 25z outputted from the data detector 15 (step S102). The branch selector 16 then excludes, from the selectable branches, a branch of which the detection signal indicates that the detected data string is invalid (step S103). The branch selector 16 then determines whether any branch remains not excluded (step S104). If any branch remains not excluded, the procedure goes to step S105, and otherwise goes to step S108.

If it is determined in step S104 that any branch remains not excluded (Yes in step S104), the branch selector 16 uses the numbers of error symbols 22a to 22z to calculate a minimum value of the number of error symbols for the remaining selectable branches (step S105). The branch selector 16 then excludes, from the remaining selectable branches, a branch of which the number of error symbols does not coincide with the minimum value calculated in step S105 (step S106). Thus, after step S106, only the branches of which the number of error symbols has the minimum value remain as the selectable branches.

The branch selector 16 then selects, from the remaining selectable branches, a branch of highest priority based on the priority information 29 outputted from the priority information generator 19 (step S107). As described above, the branch is assigned higher priority as the coverage of the antenna included in the branch is closer to that of the antenna included in the previously-selected branch. Therefore, the branch to be selected in the end is the branch of which includes the antenna of which the coverage is closest to the coverage of the antenna included in the previously-selected branch from the branches having the minimum number of error symbols.

On the other hand, if no branch remains in step S104 (No in step S104), the branch selector 16 selects the previously-selected branch again (step S108). Information indicating the branch selected in step S107 or S108 is outputted as the selection result 26.

As described above, from the branches having the minimum number of error symbols, the diversity receiver according to the present invention selects a branch that includes the antenna of which the coverage is closest to the coverage of the antenna included in the previously-selected branch (the previously-selected branch itself may be selected in some cases). Thus, it is possible to suppress the occurrence of misselection due to miscorrection, and improve the reception characteristic. The reasons for this are as follows.

In general, branch quality greatly depends on propagation loss defined mainly by a signal propagation distance and antenna's directivity. For example, longer propagation distance leads to larger propagation loss, thereby reducing branch quality. In the diversity receiver according to the present embodiment, error correcting code having less redundancy and a shorter code length is used, and branch selection is made for each block. Therefore, a time interval between branch selections is short, and the distance traveled by the transmitter during the interval is very short. Consequently, when selecting the next branch, the transmitter is presumably still located in the vicinity of the coverage of the antenna included in the previously-selected branch. Therefore, the branch including the antenna of which the coverage far away from that of the antenna included in the previously-selected branch can be considered as being large in propagation loss and poor in quality.

Therefore, as in the present embodiment, if there are a plurality of branches having the minimum number of error symbols, selected therefrom is a branch that includes the antenna of which the coverage is closest to that of the antenna included in the previously-selected branch (the previously-selected branch itself may be selected in some cases). This can reduce the probability of misselection of a branch extremely poor in quality with large propagation losses. Thus, the diversity receiver according to the present embodiment can suppress the occurrence of misselection and improve the reception characteristic more than conventional diversity receivers.

Figure 6:
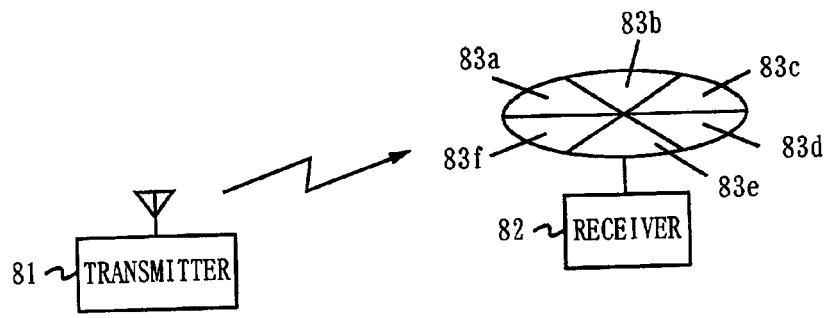
FIG. 6 is an illustration showing one example of arrangement of antennas of a receiver including the diversity receiver according to the embodiments of the present invention.
Figure 7:
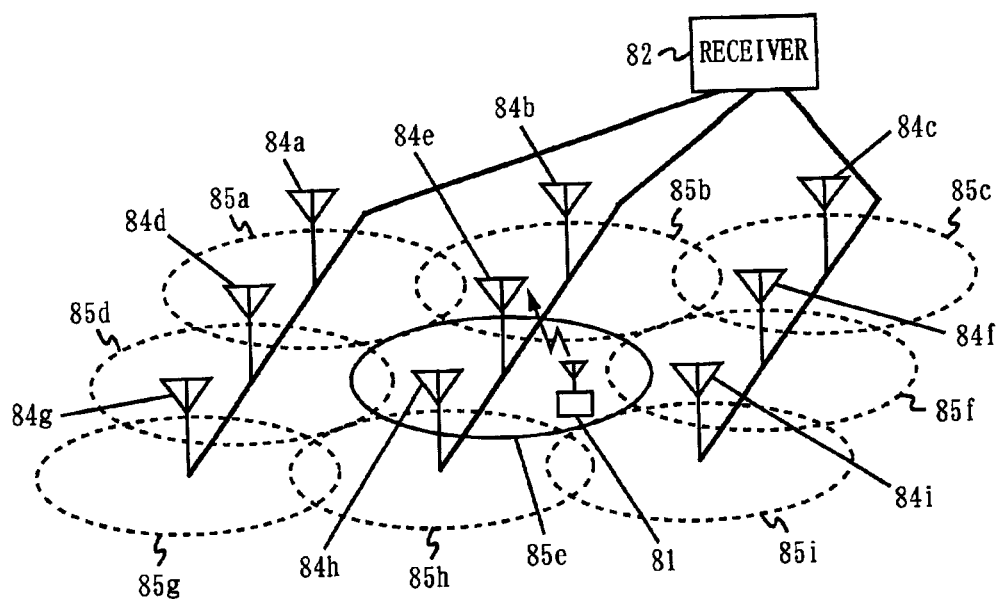
FIG. 7 is an illustration showing another example of arrangement of the antennas of the receiver including the diversity receiver according to the embodiments of the present invention.

With reference to FIGS. 6 and 7, described next is arrangement of the antennas of the diversity receiver according to the present embodiment. FIG. 6 is an illustration showing one example of arrangement of the antennas of a receiver incorporating the diversity receiver according to the present embodiment. In FIG. 6, a receiver 82 includes a plurality of directional antennas 83a to 83f. The antennas 83a to 83f are arranged at the same location, but are directed differently from each other.

For example, if the previously-selected branch is the one that includes the antenna 83d, the branch to be selected this time is any one of the branches having the minimum number of error symbols, in such order of priority as the antennas 83d, 83c, 83e, 83b, 83f, and 83a. Here, the directions covered by the antennas 83c and 83e are equally away from the direction covered by the antenna 83d corresponding to the previously-selected branch. Therefore, the order of priority of the antennas 83c and 83e may be reversed. Similarly, the directions covered by the antennas 83b and 83f are equally away from the direction covered by the antenna 83d corresponding to the previously-selected branch. Therefore, the order of priority of the antennas 83b and 83f may be reversed.

For example, when (63, 51) BCH code is used as error correcting code, each block has a length of 63 bits. Therefore, when the bit rate is on the order of several Mbps, the time interval for branch selections is several tens of $\mu$sec. During that interval, the distance traveled by a transmitter 81 or the receiver 82 is very short. For this reason, when selecting the next branch, the transmitter 81 is presumably still located in the vicinity of the direction covered by the antenna included in the previously-selected branch. Therefore, the branch including the antenna that covers the direction closer to the one covered by the antenna of the previously-selected branch can be considered as being small in propagation loss and good in quality.

Therefore, if there are a plurality of branches having the minimum number of error symbols, selected therefrom is a branch that includes the antenna covering the direction closest to the one covered by the antenna of the previously-selected branch. This can reduce the probability of misselection of a branch extremely poor in quality with large propagation loss. Therefore, adopting the antenna arrangement illustrated in FIG. 6 can suppress the occurrence of misselection and improve the reception characteristic more than conventional diversity receivers.

In the example illustrated in FIG. 6, the plurality of antennas are placed at the same location, but are directed differently from each other. Alternatively, the plurality of antennas may be placed at different locations. For example, the plurality of antennas may be arranged in a line of one dimension, on a plane of two dimensions, or in a space of three dimensions.

Described below is a typical example where the plurality of antennas are arranged on a plane of two dimensions. FIG. 7 is an example of arrangement, on a plane of two dimensions, of the antennas of the diversity receiver according to the present embodiment. In FIG. 7, a plurality of antennas 84a to 84i are arranged in a lattice pattern, and are wired to the receiver 82 for covering cells 85a to 85i.

In FIG. 7, if the previously-selected branch is the one that includes the antenna 84e, the branch to be selected this time is any one of the branches having the minimum number of error symbols, in such order of priority as the antennas 84e, 84b, 84d, 84f, 84h, 84a, 84c, 84g, and 84i. Here, the cells covered by the antennas 84b, 84d, 84f, are 84h are equally away from the cell 85e covered by the antenna 84e corresponding to the previously-selected branch. Therefore, the order of priority of these four antennas may be arbitrary. Similarly, the cells covered by the antennas 84a, 84c, 84g, are 84i are equally away from the cell 85e covered by the antenna 84e corresponding to the previously-selected branch. Therefore, the order of priority of these four antennas may be arbitrary.

As such, according to the diversity receiver according to the present embodiment, the antennas can be arranged in various ways. With any antenna arrangement, details of the priority table are expediently determined based on the coverage of the antenna included in each branch, thereby suppressing the occurrence of misselection and improving the reception characteristic.

(Second Embodiment)

Figure 8:
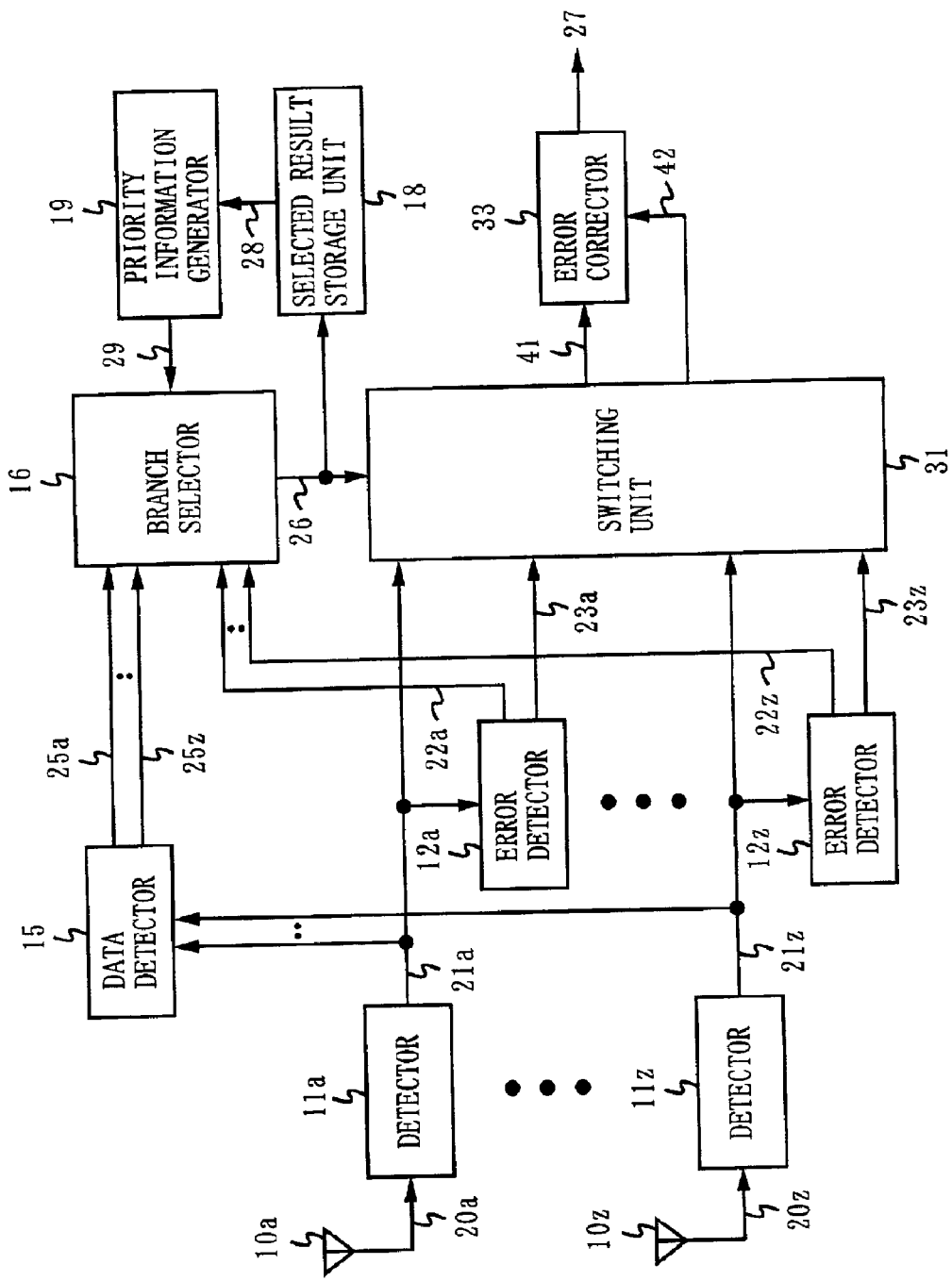
FIG. 8 is a block diagram showing the construction of a diversity receiver according to a second embodiment of the present invention.

FIG. 8 is a block diagram showing the construction of a diversity receiver according to a second embodiment of the present invention. The diversity receiver illustrated in FIG. 8 includes antennas 10a to 10z, detectors 11a to 11z, error detectors 12a to 12z, a data detector 15, a branch selector 16, a switching unit 31, a selection result storage unit 18, a priority information generator 19, and an error corrector 33. The diversity receiver is characterized in that only one error corrector 33 is provided in common with all branches. The components identical to those in the first embodiment are provided with the same reference numerals, and are not described in detail herein.

The detectors 11a to 11z and the error detectors 12a to 12z are provided correspondingly to the antennas 10a to 10z, respectively. The antennas 10a to 10z, the detectors 11a to 11z, and the error detectors 12a to 12z construct branches for processing modulated signals 20a to 20z, respectively.

The modulated signals 20a to 20z are subjected to the same processing on the respective branches, as in the first embodiment. However, the diversity receiver according to the present invention does not include error correctors for the respective branches. Therefore, decoded data strings are not obtained for the respective branches.

The switching unit 31 are supplied with detected data strings 21a to 21z, error locations 23a to 23z, and a selection result 26. Based on the selection result 26, the switching unit 31 selects one of the detected data strings 21a to 21z, and outputs the selected data string as a detected data string 41. The switching unit 31 also selects one of the error locations 23a to 23z, and outputs the selected error location as an error location 42.

The error corrector 33 uses the selected error location 42 to correct an error in the selected detected data string 41, and outputs the corrected detected data string as an output data string 27. The diversity receiver illustrated in FIG. 8 outputs the output data string 27 as data having the best characteristic of all received through the plurality of antennas 10a to 10z.

In the first embodiment, data selection is carried out after error correction. On the contrary, in the present embodiment, data selection is carried out before error correction. In either embodiment, however, the output data string obtained therein is the same if the components common to these two embodiments are identical. Therefore, according to the diversity receiver of the present embodiment, as with the first embodiment, it is possible to suppress the occurrence of misselection due to miscorrection, and therefore improve the reception characteristic. In addition, the diversity receiver according to the present embodiment has an effect of reducing the circuit size because the number of error correctors required is smaller than that in the first embodiment.

(Third Embodiment)

A diversity receiver according to a third embodiment of the present invention is characterized in that a specific branch is excluded in branch selection based on the immediately-previous selection result. The diversity receiver according to the present embodiment has such a construction as illustrated in FIG. 1 or 8. The diversity receiver according to the present embodiment is characterized especially by the details of the priority information 29 and the procedure of branch selection carried out by the branch selector 16.

In the present embodiment, the priority information 29 contains information indicating a branch to be excluded for branch selection. More specifically, in the priority information 29, the branch to be excluded is the one that includes the antenna of which the coverage is a predetermined distance away from the coverage of the antenna included in the previously-selected branch.

Figure 9:
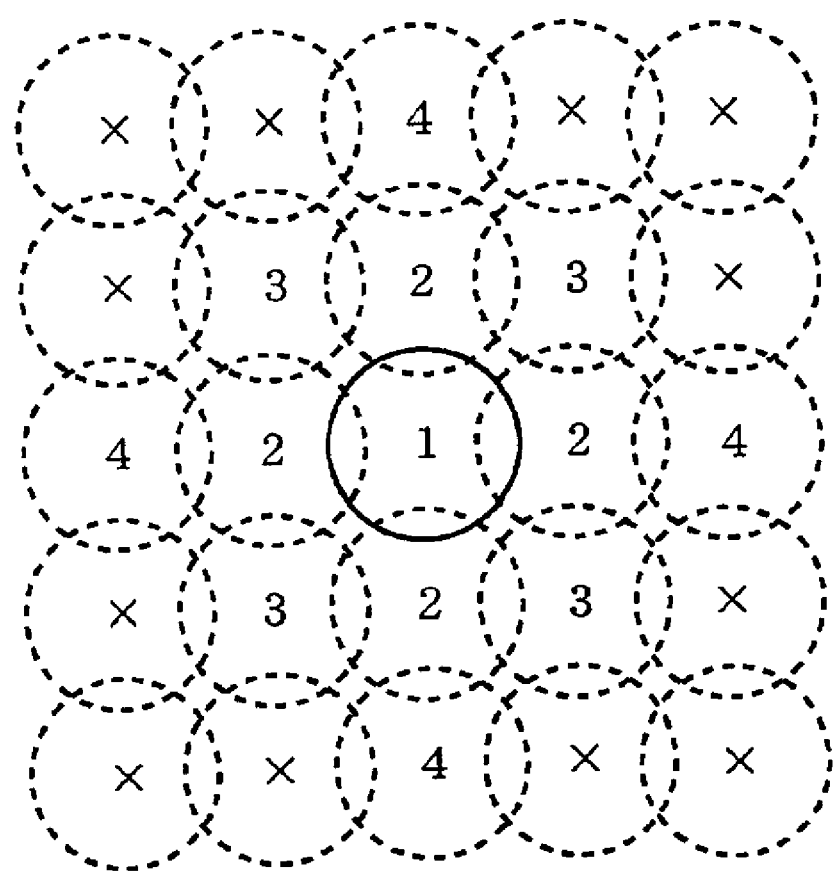
FIG. 9 is an illustration as to a diversity receiver according to a third embodiment, showing a state where each branch is assigned priority correspondingly to a coverage of each antenna.

FIG. 9 is an illustration as to the diversity receiver according to the present embodiment, showing a state where each branch is assigned priority correspondingly to the coverage of each antenna. In FIG. 9, circles with a cross indicate branches to be excluded for branch selection. In this example, the branches with priority 5 or more assigned in FIG. 4 are determined to be excluded from the selectable branches because those branches each include the antenna that covers the area far away from the area covered by the antenna included in the previously-selected branch.

Figure 10:
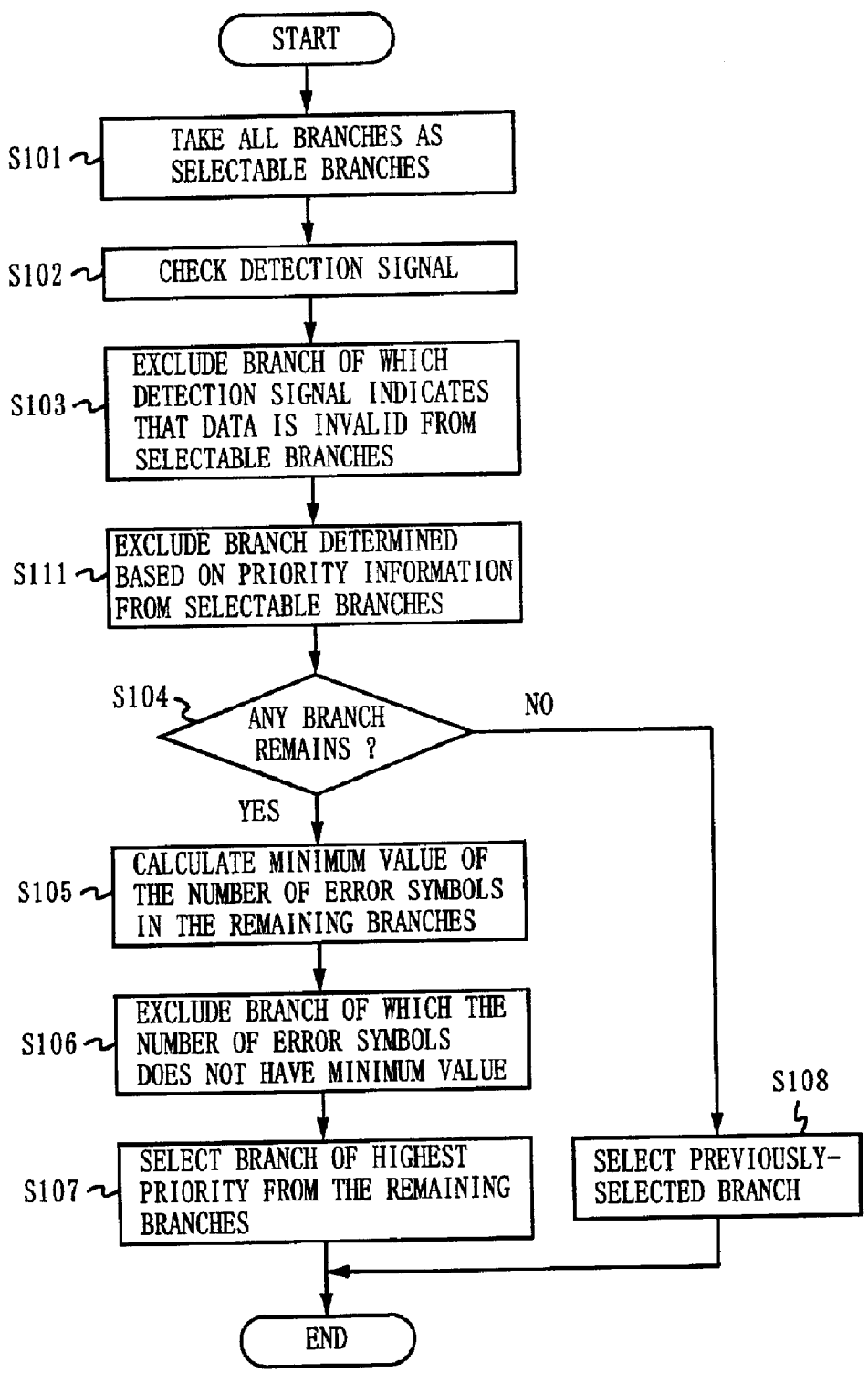
FIG. 10 is a flowchart showing the procedure of branch selection carried out by a branch selector of the diversity receiver according to the third embodiment of the present invention.

FIG. 10 is a flowchart showing the procedure of branch selection carried out by the branch selector 16 of the diversity receiver according to the present embodiment. The flowchart shown in FIG. 10 is similar to the one shown in FIG. 5, with step S111 added thereto. In step S111, the branch selector 16 excludes, from the selectable branches at that moment, a branch determined to be excluded based on the priority information 29. The other steps are identical to those in the first embodiment, and therefore are not described herein.

According to the procedure of branch selection shown in FIG. 10, a branch is excluded from the selectable branches and is never selected if the branch includes the antenna of which the coverage is a predetermined distance away from that of the antenna included in the previously-selected branch. Thus, compared with the first embodiment, the occurrence of misselection due to miscorrection can be suppressed more, and the reception characteristic can be improved more.

In the flowchart shown in FIG. 10, the branches that satisfy two conditions in steps S103 and S111 remain as the selectable branches. From these branches, the one having the minimum number of error symbols is selected. Alternatively, if only one branch that satisfies either one of the two conditions remains, the remaining branch may be selected irrespectively of whether the branch satisfies the other condition. Furthermore, the antennas can be arranged in various ways in the second and third embodiments as with the first embodiment.

While the invention has been described in detail, the foregoing description is in all aspects illustrative and not restrictive. It is understood that numerous other modifications and variations can be devised without departing from the scope of the invention.

What is claimed is:

1. A diversity receiver for receiving modulated signals each modulated with a data string coded for error correction, the diversity receiver comprising:

a plurality of antennas for receiving, independently of each other, the modulated signals;

detecting means for detecting the modulated signals received by the antennas, and obtaining a plurality of detected data strings:

error detecting means for detecting the numbers of error symbols and error locations in the respective detected data strings;

branch selecting means for selecting one of branches composed of the antennas, detecting means, and the error detecting means;

output generating means for outputting a result obtained by carrying out, with reference to the error locations detected by the error detecting means, error correction on one of the detected data strings that corresponds to a selection result indicating the branch selected by the branch selecting means;

selection result storage means for storing the selection result of the branch selecting means; and priority information generating means for generating priority information indicating priority in branch selection based on the selection result stored in the selection result storage means, wherein the branch selecting means selects the branch based on the numbers of error symbols detected by the error detecting means and the priority information generated by the priority information generating means.

2. The diversity receiver according to claim 1, wherein the branch selecting means selects the branch of highest priority in the priority information from the branches of which the number of error symbols is minimum.

3. The diversity receiver according to claim 2, wherein the selection result storage means stores an immediately-previous selection result indicating the branch selected at an immediately-previous time by the branch selecting means, and the priority information generating means generates the priority information based on the immediately-previous selection result stored in the selection result storage means.

4. The diversity receiver according to claim 3, wherein the priority information indicates that the branch is assigned higher priority as a coverage of the antenna included in the branch is closer to a coverage of the antenna included in the branch selected at the immediately-previous time.

5. The diversity receiver according to claim 4, wherein the priority information indicates a branch to be excluded for branch selection, and the branch selecting means selects one of the branches other than the branch indicated to be excluded by the priority information.

6. The diversity receiver according to claim 5, wherein the priority information indicates that the branch to be excluded includes the antenna of which the coverage is a predetermined distance away from the coverage of the antenna included in the branch selected at the immediately-previous time.

7. The diversity receiver according to claim 1, wherein the output generating means includes:

error correcting means for correcting the detected data strings with the error locations detected by the error detecting means, and obtaining a plurality of decoded data strings; and output switching means for selecting and outputting one of the decoded data strings based on the selection result of the branch selecting means.

8. The diversity receiver according to claim 1, wherein the output generating means includes:

switching means for selecting, based on the selection result of the branch selecting means, one of the detected data strings, and one of the error locations detected by the error detecting means; and error correcting means for correcting the detected data string selected by the switching means with the error location selected by the switching means, and outputting the corrected detected data string.

9. The diversity receiver according to claim 1, wherein the antennas are arranged at a same location and directed differently from each other.

10. The diversity receiver according to claim 1, wherein the antennas are arranged at different locations.

* * * * *